United States Patent
Takano et al.

(10) Patent No.: US 6,683,439 B2
(45) Date of Patent: Jan. 27, 2004

(54) DC POWER SOURCE UNIT WITH BATTERY CHARGING FUNCTION

(75) Inventors: Nobuhiro Takano, Hitachinaka (JP); Takeshi Takeda, Hitachinaka (JP); Eiji Nakayama, Hitachinaka (JP); Kazuhiro Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/153,807

(22) Filed: May 24, 2002

(65) Prior Publication Data

US 2002/0175654 A1 Nov. 28, 2002

(30) Foreign Application Priority Data

May 25, 2001  (JP) ..................................... P2001-156588

(51) Int. Cl.$^7$ ............... H02J 7/00; H02J 7/40
(52) U.S. Cl. .................. 320/132; 307/150; 320/150
(58) Field of Search .......................... 320/132, 107, 320/110, 114, 115, 150; 307/80, 126, 150; 439/188; 363/74; 323/285

(56) References Cited

U.S. PATENT DOCUMENTS

| 5,091,688 A | * | 2/1992 | Ewald et al. ............... 363/175 |
| 5,159,256 A | * | 10/1992 | Mattinger et al. ........... 320/115 |
| 5,793,123 A | * | 8/1998 | Ho et al. ....................... 307/80 |
| 6,573,621 B2 | * | 6/2003 | Neumann .................... 307/150 |
| 6,597,572 B2 | * | 7/2003 | Miyamoto et al. .......... 320/125 |

FOREIGN PATENT DOCUMENTS

JP  2000-184614  6/2000

* cited by examiner

Primary Examiner—Pia Tibbits
(74) Attorney, Agent, or Firm—Sughrue Mion, PLLC

(57) ABSTRACT

A DC power source unit supplies a DC voltage to an electrically powered tool through an adapter and also charges a battery pack used as an alternative power source of the tool. With the DC power source unit of the invention, a microcomputer receives a temperature signal indicative of a temperature of the battery pack and determines that the battery pack is fully charged based on the temperature signal. This determination is made regardless of whether the battery pack is being charged or not. As such, the fully charged condition of the battery pack can be accurately detected even if the tool is operated when the battery pack is almost fully charged.

7 Claims, 3 Drawing Sheets

DC POWER SOURCE UNIT WITH BATTERY CHARGING FUNCTION

BACKGROUND OF THE INVENTION

1. Field of the Invention

The present invention relates to a DC power source unit that can selectively charge a battery pack, which is used as a power source for a cordless power tool, and supply DC voltage to the cordless power tool through an adaptor shaped like the battery pack. More particularly, the invention relates to a DC power source unit that can accurately detect the fully charged condition of the battery pack.

2. Description of the Related Art

Cordless power tools are convenient because they can be used anywhere without being restricted by the length of a power cable. However, whenever the battery runs low, the battery pack needs to be removed and charged or else replaced with another battery pack that has already been charged.

A DC power source unit that converts alternating current to direct current can be used along with the battery pack. That is, the DC power source unit can be used when the cordless power tool is to be operated in a single place that has a source of alternating current, and the battery pack can be used when the cordless power tool is to be operated at several different places that have no source of alternating current.

However, this situation has a problem in that the operator of the cordless power tool must carry both the DC power source and the battery pack's charging unit to the work area. Japanese Patent Publication No. 2000-184614(A) discloses a DC power source unit with a charging function. When the DC power source unit detects that the attached cordless power tool is being operated, it supplies power only to the cordless power tool and does not supply power to the battery pack for charging purposes. On the other hand, when DC power source unit detects that the cordless power tool is not being operated, then it charges a battery pack. That is, priority is given to supplying power to the cordless power tool and charging the battery pack is performed only when the cordless power tool is not being operated.

According to the DC power source unit of Japanese Patent Publication No. 2000-184614(A), detection of the battery pack's fully charged condition is performed only when the battery pack is being charged. When the cordless power tool is turned ON immediately before the battery pack is fully charged, the DC power source unit is switched to a tool driving mode and charging the battery pack is interrupted so that detection of the battery pack's fully charged condition is also interrupted. The detection of the fully charged condition will not be performed until the operations of the cordless power tool are stopped and charging the battery pack is resumed. Even if charging the battery pack is resumed, the fully charged condition cannot be detected immediately but detection of the fully charged condition will be made after the battery pack has actually reached the fully charged condition. This inaccurate detection of the fully charged condition is a problem with the conventional device.

More specifically, detection of the battery pack's fully charged condition is performed based on change of the battery voltage and/or change of the battery temperature. To obtain the change of the battery voltage, for example, the battery voltage is sampled at every predetermined sampling period. Consecutively sampled voltages $V_i$ to $V_0$ are temporarily stored in a memory and the change of the battery voltage is computed by subtracting the i-th sampled voltage $V_1$ from the currently sampled voltage $V_0$. Therefore, the change of the battery voltage cannot be obtained until a period of time corresponding to i sampling periods has been expired. The battery pack that has reached the fully charged condition during this period of time cannot be detected as being fully charged. The same is true with respect to detection of the fully charged condition based on the change of the battery temperature.

In addition, when the cordless power tool is frequently switched ON and OFF during charging the battery pack, the charging circuit is rendered OFF and ON corresponding to ON and OFF of the cordless power tool. For a circuit configuration in which a relay contact is used for switching the charging circuit ON and OFF, the number of switching actions of the relay contact is increased if the cordless power tool is frequently switched ON and OFF, causing the service life of the relay contact and of the DC power source unit to shorten.

SUMMARY OF THE INVENTION

In view of the foregoing, it is an object of the invention to solve the above-described problems accompanying the prior art devices and to provide a DC power source unit that can accurately detect the fully charged condition of a battery pack and has a long service life.

To achieve the above and other object, there is provided according to one aspect of the invention a DC power source unit that is used as a power source of an electrically powered tool. The DC power source unit includes charging means, a power output switch circuit, a battery condition detecting means, and a controller. The charging means is provided for charging the battery pack used as an alternative power source of the tool. The power output switch circuit is provided for switching between supplying the DC power to the tool and supplying DC power to the battery pack for charging the battery pack. The battery condition detecting means is provided for detecting a condition of the battery pack and outputs a condition signal indicative of the condition of the battery pack. The controller receives the condition signal from the battery condition detecting means and determines that the battery pack is fully charged when the condition signal has reached a predetermined value. The controller determines that the battery pack is fully charged regardless of whether the charging means is supplied with the DC power. In one example, the battery condition detecting means is battery temperature detector. The battery temperature detector detects a temperature of the battery pack. In this case, the condition signal output from the battery temperature detector is indicative of the temperature of the battery pack. According to the invention, even if the DC power is supplied to the tool for its operation and the battery pack is not charged, the controller determines that the battery pack has reached the fully charged condition based on the temperature of the battery pack.

Measuring means may be further provided for measuring a non-use period of time during which time the tool is continuously held in a non-use condition. The controller outputs a charge enabling signal to the power output switch circuit when the non-use period of time exceeds a predetermined period of time to allow the charging means to resume charging the battery pack. Conversely, when the non-use period of time is shorter than the predetermined period of time, the charging the battery pack is prohibited.

Load current detecting means may further be provided for detecting a load current flowing in the tool. The controller determines that the tool is in the non-use condition when the load current detecting means does not detect the load current.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE PREFERRED EMBODIMENTS

A direct current (DC) power source unit 100 according to an embodiment of the present invention will be described while referring to the accompanying drawings.

Figure 1:
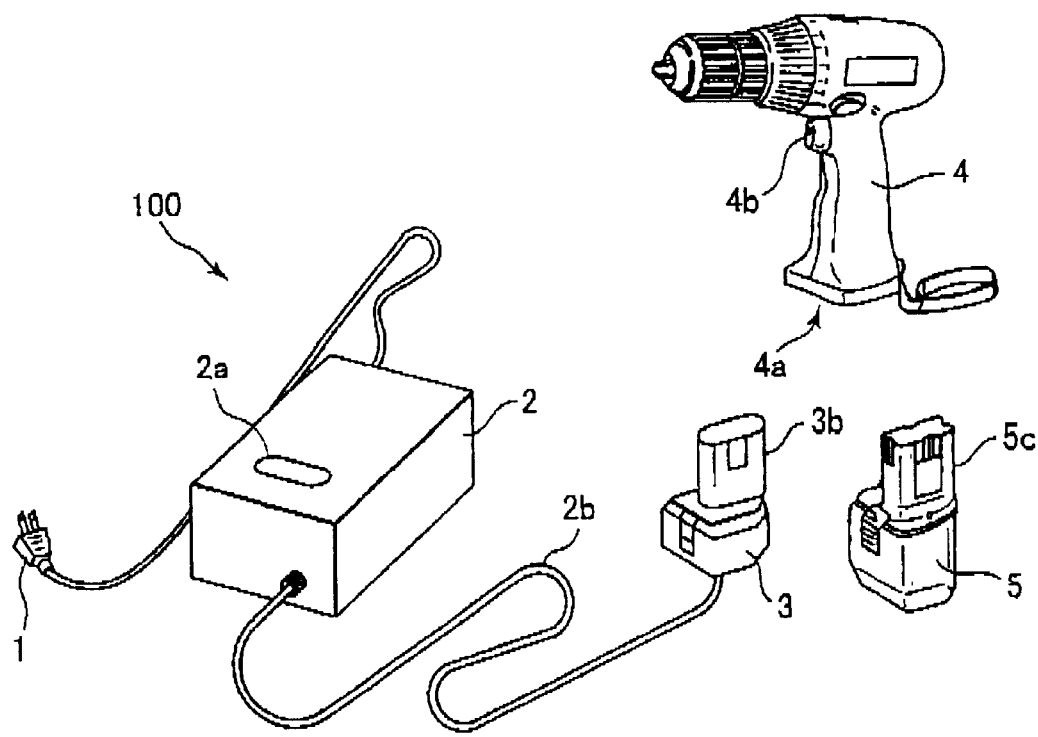
FIG. 1 is a perspective view showing a DC power source unit with a charging function according to an embodiment of the present invention.

As shown in FIG. 1, a cordless power tool 4 is used with selective one of the DC power source unit 100 and a battery pack 5. The cordless power tool 4 includes a power switch 4b. The battery pack 5 includes an insertion portion 5c that is detachably mountable into a handgrip recess 4a of the cordless power tool 4.

The DC power source unit 100 includes an AC cord 1, a main unit 2, and an adapter 3. The AC cord 1 connects the main unit 2 to a commercial alternating current (AC) power source. Also, an output cable 2b connects the main unit 2 to the adapter 3. The adapter 3 includes an adapter plug 3b which has the same shape as the insertion portion 5c of the battery pack 5. The adapter plug 3b is inserted into the handgrip recess 4a of the cordless power tool 4 in order to supply power to the cordless power tool 4. The main unit 2 has a battery pack insertion recess 2a with the same shape as the handgrip recess 4a of the cordless power tool 4. The insertion portion 5c of the battery pack 5 is inserted into the battery pack insertion recess 2a in order to charge the battery pack 5 in a manner to be described later.

Figure 2:
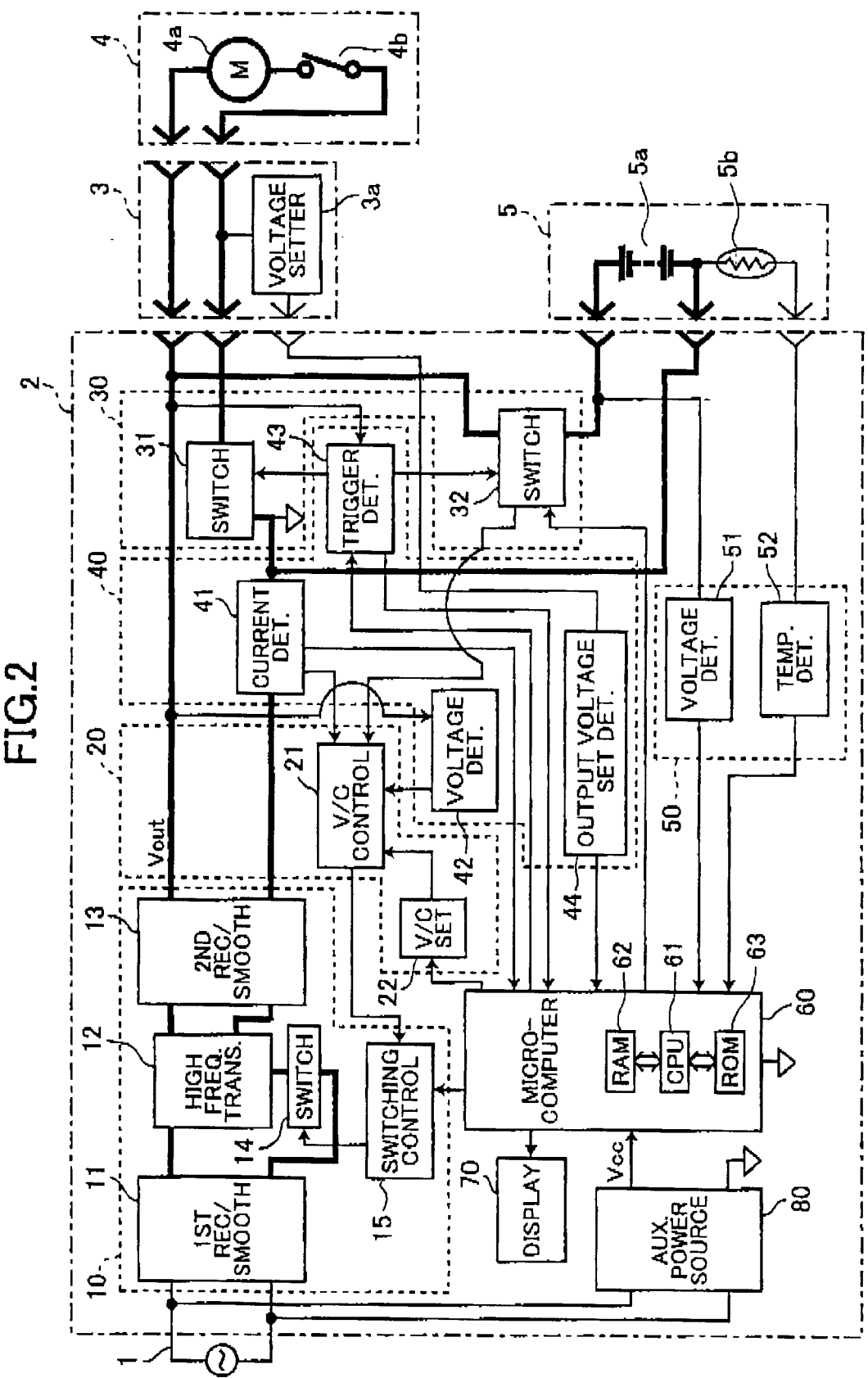
FIG. 2 is a block diagram showing an electrical arrangement of the DC power source unit according to an embodiment of the invention.

As shown in FIG. 2, the adapter 3 further includes an output voltage setter 3a for designating the voltage that corresponds to the rated voltage of the cordless power tool 4 to which the adapter 3 is attached. The cordless power tool 4 also includes a DC motor 4a connected in series with the power switch 4b. When the power switch 4b is turned ON, then DC power is supplied from the main unit 2 through the adapter 3 to the cordless power tool 4.

The battery pack 5 further includes a chargeable battery 5a and a thermistor 5b. The thermistor 5b is attached adjacent to or in contact with the chargeable battery 5a.

As shown in FIG. 2, the main unit 2 includes a switching power source 10, a power source output controller 20, a power source output switcher 30, a power source output detector 40, a battery condition detector 50, and a microcomputer 60.

The switching power source 10 includes a first rectifying and smoothing circuit 11, a high-frequency transformer 12, a second rectifying and smoothing circuit 13, a switching element 14, and a switching control circuit 15. The switching control circuit 15 adjusts output voltage and output current from the second rectifying and smoothing circuit 13 by changing width of the pulse applied to the switching element 14.

The power source output controller 20 includes a voltage/current control circuit 21 and a voltage/current setting circuit 22. The voltage/current setting circuit 22 sets the value of a drive voltage required for driving the connected cordless power tool 4 and the value of a current required for charging a mounted battery pack 5. Based on signals from an output current detecting circuit 41 and a voltage detection circuit 42 of the power source output detector 40, the voltage/current control circuit 21 controls the switching power source 10 to adjust voltage and current of power output from the main unit 2 to match values set in the voltage/current setting circuit 22.

That is, while the power switch 4b is turned ON to drive the cordless power tool 4, the voltage/current control circuit 21 receives a current signal from the output current detecting circuit 41 and a voltage signal from the voltage detection circuit 42 that indicate actual current and voltage, respectively, being supplied to the cordless power tool 4. The voltage/current control circuit 21 feeds back these current and voltage signals to the switching control circuit 15 so that the switching control circuit 15 can control the switching duty of the switching element 14 in order to compensate for voltage drop across the cable 2b of the adapter 3 and thus maintain the voltage supplied to the cordless power tool 4 to levels set in the voltage/current setting circuit 22.

On the other hand, while the power switch 4b is turned OFF and a battery pack 5 is mounted in the main unit 2 for charging, the voltage/current control circuit 21 receives the current signal from the output current detecting circuit 41 and feeds back to the switching control circuit 15. The switching control circuit 15 controls the switching duty of its switching element 14 to control charge current supplied to the battery pack 5. The switching control circuit 15 further controls the switching duty of the switching element 14 based on a signal from the battery condition detector 50.

The power source output switcher 30 includes a power source output switch circuit 31 and a charge output switch circuit 32. The power source output switch circuit 31 enables supply of power output to the cordless power tool 4 when the power switch 4b is turned ON. The charge output switch circuit 32 enables charging of the battery pack 5 when the cordless power tool 4 is not being used.

The power source output detector 40 includes an output current detecting circuit 41, a voltage detection circuit 42, a trigger detection circuit 43, and an output voltage setting detection circuit 44. The output current detecting circuit 41 detects the current being supplied to the cordless power tool 4 while the power switch 4b is turned ON, and the charge current being supplied to the battery pack 5 while the power switch 4b is turned OFF, and outputs a current signal accordingly to the voltage/current control circuit 21 for the purpose of adjusting the voltage supplied to the cordless power tool 4 to the level set by the voltage/current setting circuit 22. The voltage detection circuit 42 detects the voltage output from the second rectifying and smoothing circuit 13 and outputs a signal accordingly to the voltage/current control circuit 21 for the purpose of correcting for voltage drop across the cable 2b of the adapter 3. The trigger detection circuit 43 detects whether the power switch 4b is turned ON. When the trigger detection circuit 43 detects that the power switch 4b is turned ON, it instantaneously outputs a signal for disabling charging operations and a signal for enabling supply of power to the cordless power tool 4. The output voltage setting detection circuit 44 detects the voltage value set by the output voltage setter 3a of the adapter 3.

The battery condition detector 50 includes a battery voltage detection circuit 51 and a battery temperature detection circuit 52. The battery voltage detection circuit 51 detects battery voltage of the chargeable battery 5a. The battery temperature detection circuit 52 detects battery temperature based on the resistance value of the thermistor 5b in the battery pack 5.

The microcomputer 60 includes a central processing unit (CPU) 61, a random access memory (RAM) 62, and a read-only memory (ROM) 63 for performing a variety of different functions. For example, the microcomputer 60 sets the drive voltage supplied to the cordless power tool 4 based on output from the power source output detector 40 and, while the cordless power tool 4 is not being used, sets the charge current that is supplied to the battery pack 5 based on output from the battery condition detector 50. The microcomputer 60 also determines whether battery charge can be performed based on output from the battery condition detector 50 and on whether the cordless power tool 4 is in a condition of non-use, that is, whether the power switch 4b is turned OFF. When the microcomputer 60 determines that battery charge can be performed, the microcomputer 60 outputs a charge enabling signal to the charge output switch circuit 32 through the trigger detection circuit 43.

The main unit 2 also includes a display circuit 70 and an auxiliary power source circuit 80. The display circuit 70 is configured from an LED, for example, and displays a variety of information for the operator, such as, that the cordless power tool 4 is being used or is in a usable condition, or that the battery pack 5 is being charged. The auxiliary power source circuit 80 supplies a standard voltage Vcc to the power source of the microcomputer 60, and to the power source output controller 20, the power source output detector 40, the battery condition detector 50, and the like.

Figure 3:
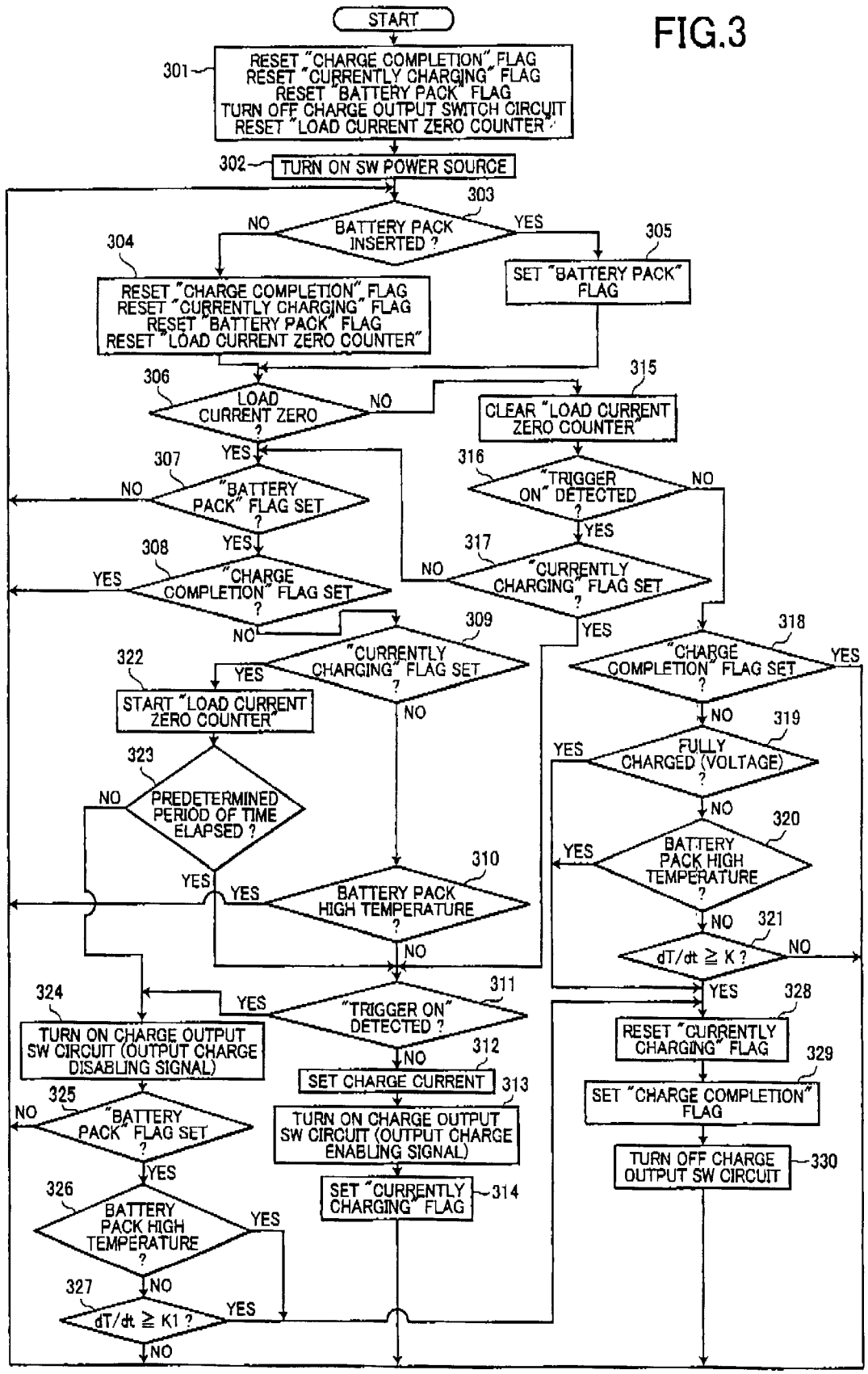
FIG. 3 is a flowchart illustrating operations of the DC power source unit according to the embodiment of the invention.

Next, operations of the DC power source unit configured as shown in FIG. 2 will be described with reference to the flowchart shown in FIG. 3.

When the AC cord 1 is connected to a commercial 100V AC power source, the microcomputer 60 and other components, such as the power source output controller 20, are supplied with a standard voltage Vcc from the auxiliary power source circuit 80. In step 301, the microcomputer 60 performs various initial settings including resetting a "charge completion" flag, a "currently charging" flag, and a "battery pack" flag in the RAM 62 of the microcomputer 60, and also resetting the load current zero counter. The "battery pack" flag indicates whether or not the battery pack 5 is inserted into the battery pack insertion recess 2a of the main unit 2. Further, the microcomputer 60 performs initial settings of the charge output switch circuit 32 for placing it in an OFF state. In step 302, the microcomputer 60 outputs a start-up signal to the switching control circuit 15, thereby causing the switching power source 10 to operate. In this condition, when the power switch 4b of the cordless power tool 4 is turned ON, the trigger detection circuit 43 of the power source output detector 40 turns ON the power source output switch circuit 31 of the power source output switcher 30 so that a drive voltage that corresponds to the rated voltage of the presently-connected cordless power tool 4 is supplied from the switching power source 10 to the cordless power tool 4.

Next, in step 303, the microcomputer 60 judges whether the battery pack 5 is inserted into the battery pack insertion recess 2a of the main unit 2 based on output from the battery voltage detection circuit 51 and the battery temperature detection circuit 52 of the battery condition detector 50. If a battery pack 5 is judged to be inserted into the battery pack insertion recess 2a (step 303: YES), then in step 305 the microcomputer 60 sets the "battery pack" flag. If not (step 303: NO), then in step 304 the microcomputer 60 resets the "charge completion" flag, the "currently charging" flag, and the "battery pack" flag in the RAM 62. Also, the microcomputer 60 resets the load current zero counter. Next, in step 306 the microcomputer 60 judges whether the power switch 4b has been turned OFF based on the load current output from the output current detecting circuit 41.

When the load current is determined to be zero (step 306: YES) indicating that the power switch 4b may have been turned OFF, the microcomputer 60 judges whether the battery pack 5 is inserted into the battery pack insertion recess 2a of the main unit 2 while referring to the "battery pack" flag (step 307). If not (step 307: NO), then the program returns to step 303. On the other hand, when it is judged that a battery pack 5 is inserted into battery pack insertion recess 2a of the main unit 2 (step 307: YES), then the microcomputer 60 judges whether the charge of the battery pack 5 is completed while referring to the "charge completion" flag (step 308). If the charge of the battery pack 5 is completed (step 308: YES), then the program returns to step 303.

On the other hand, when it is determined that the charge of the battery pack 5 has not yet been completed (step 308: NO), the microcomputer 60 judges whether the battery pack 5 is being charged while referring to the "currently charging" flag (step 309). When it is determined that the battery pack 5 is not being charged (step 309: NO), then the microcomputer 60 judges whether the battery pack 5 is at a high temperature based on the output from the battery temperature detection circuit 52 (step 310). When the battery pack 5 is determined to be high temperature (step 310: YES), then the program returns to step 303. On the other hand, when the battery pack 5 is determined to be not high temperature (step 310: NO), then the microcomputer 60 monitors whether the power switch 4b is turned ON based on the output from the trigger detection circuit 43 (step 311).

When it is judged in step 311 that the power switch 4b is not turned OFF (step 311: YES), then in step 312 the microcomputer 60 outputs a signal to the voltage/current setting circuit 22 for setting the charge current to a predetermined value in order to control the charge current to the predetermined value. Next, in step 313 the microcomputer 60 outputs a charge enabling signal to the trigger detection circuit 43 and the charge output switch circuit 32. The charge output switch circuit 32 is turned ON whereas the power source output switch circuit 31 is turned OFF. Turning ON the charge output switch circuit 32 allows charging operations to start. In step 314, the "currently charging" flag is set to indicate that the battery pack 5a is being charged, whereupon the program returns to step 303.

When the judgement made in step 306 indicates that the load current is not zero (step 306: NO), the load current zero counter is cleared (step 315). Then, the microcomputer 60 monitors whether the power switch 4b is turned ON based on the output from the trigger detection circuit 43 (step 316). When it is judged in step 316 that the power switch 4b is turned ON (step 316: YES) and in step 317 that the "currently charging" flag is set (step 317: YES), the program jumps to step 311. When the "currently charging" flag is reset (step 317: NO), the program returns to step 307.

When it is judged in step 316 that the power switch 4b is not turned ON (step 316: NO), in step 138 the microcomputer 60 judges whether charging the battery pack 5 has been completed. When the microcomputer 60 determines that charging the battery pack 5 has been completed while referring to the "charge completion" flag (step 318: YES), the program returns to step 303. On the other hand, when the microcomputer 60 determines that charging the battery pack 5 has not yet been completed (step 318: NO), then in step 319 the microcomputer 60 judges whether the battery pack 5 has been fully charged based on input to the microcomputer 60 via the battery voltage detection circuit 51. It should be noted that there are many well know methods of detecting the fully charged condition of the battery. For example, the fully charged condition of the battery pack 5 can be detected based on battery voltage. Specifically, when the peak of the battery voltage is detected or when the battery voltage drops a predetermined value from the peak voltage (referred to as −ΔV detection), the battery pack 5 is determined to be fully charged.

When the microcomputer 60 determines that the battery pack 5 is fully charged (step 319: YES), then in step 328 the "currently charging" flag is reset, in step 329 the "charge completion" flag is set, and in step 330 the charge output switch circuit 32 is turned OFF. Then, the program returns to step 303.

On the other hand, when the microcomputer 60 determines that the battery pack 5 is not fully charged (step 319: NO), then in step 320 the microcomputer 60 judges whether the battery pack 5 is at high temperature based on the output from the battery temperature detection circuit 52. Charging the battery pack 5 needs to be stopped when its temperature is high. When the microcomputer 60 determines that the battery pack 5 is at high temperature (step 320: YES), the program jumps to step 328. On the other hand, when the microcomputer 60 determines that the battery pack 5 is not at high temperature (step 320: NO), the microcomputer 60 judges whether the battery pack 5 has reached a fully charged condition based on the output from the battery temperature detection circuit 52. The battery temperature detection circuit 52 detects the resistance value of a thermistor 5b at every predetermined sampling period to detect the temperature of the battery pack 5. When a temperature gradient computed from the sampled temperatures has exceeded a predetermined value K (step 321: YES), the microcomputer 60 judges that the battery pack 5 has reached a fully charged condition. This method is known as a dT/dt detection. When the temperature gradient is less than the predetermined value K (step 321: NO), then the program returns to step 303. When the microcomputer 60 determines that the temperature gradient has exceeded the predetermined value K, the battery pack 5 is determined to be fully charged and the program proceeds to step 328.

In step 309, when the microcomputer 60 determines that the battery pack 5 is being charged (step 309: YES), the load current zero counter is stated (step 322). That is, when the power switch 4b is once turned ON during charging the battery pack 5 and is thereafter turned OFF, the load current zero counter is started. Then, the microcomputer 60 judges whether the load current zero condition has continued for a predetermined period of time, that is, whether the non-use period of the cordless power tool 4 has continued for the predetermined period of time. Stated differently, the microcomputer 60 judges whether the power switch 4b has been turned OFF for the predetermined period of time (step 323). If so, the program skips to step 311 in order to resume charging of the battery pack 5. The "predetermined period of time" to be measured in step 323 is set to harmonize the sampling period of time for sampling the battery voltage and the temperature of the battery pack and also to match how the cordless power tool 4 is used. An example of the "predetermined period of time" is 1 minute.

In step 323, when the load current zero condition has not continued for the predetermined period of time, the microcomputer 60 generates a charge disabling signal to the trigger detection circuit 43 and the charge output switch circuit 32 (step 324). Following this step, the microcomputer 60 judges whether the "battery pack" flag is set (step 325). When the "battery pack" flag is reset (step 325: NO), then the program returns to step 303. On the other hand, when the "battery pack" flag is set (step 325: YES), in step 326 the microcomputer 60 judges whether the battery pack 5 is at a high temperature based on the output from the battery temperature detection circuit 52. This means that even if the power switch 4b is once turned ON during charging the battery pack 5 and so the battery pack 5 is not currently being charged, determination as to whether the battery pack 5 has reached the fully charged condition is made without interruption. When the microcomputer 60 determines that the battery pack 5 is at a high temperature, the program returns to step 328. On the other hand, when the microcomputer 60 determines that the battery pack 5 is not at a high temperature, the temperature gradient over a predetermined number of sampling periods is computed based on the output from the battery temperature detection circuit 52. When the temperature gradient thus computed exceeds a predetermined value K1 (K1≦K), then the microcomputer 60 implements in step 327 the judgement of the fully charged condition by way of dT/dt detection method. In step 327, when the temperature gradient is less than the predetermined value K1, the program returns to step 303. When the temperature gradient is above the predetermined value K1, the battery pack 5 is judged to be fully charged condition, whereupon the program again returns to step 328.

While in the above description the criteria for the dT/dt detection are set differently between the detection during charging of the battery pack 5 and detection during interruption of the charging of the battery pack 5, these two values K and K1 can be set to the same value. What is most important in the computation of the temperature gradient for the dT/dt detection is to compute the temperature gradient continuously regardless of whether the battery pack 5 is being currently charged or charging of the battery pack 5 is being interrupted. By doing so, even if the cordless power tool is operated when the battery pack 5 has been charged to a nearly fully charged condition, a fully charged detection of the battery pack 5 can be made based on the battery temperature regardless of whether or not the charging current actually flows. Therefore, accurate detection of the fully charged condition can be accomplished.

Batteries, such as nickel-cadmium and nickel-hydrogen batteries, generate oxygen gas when the batteries approach to the fully charged condition and oxygen gas absorption reaction occurs in the batteries, resulting in generation of heat in the batteries. As such, the temperature of such type of batteries increases even after stoppage of charging operation. Therefore, the continuous detection of the battery temperature is effective in detecting a fully charged condition of the batteries.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A DC power source unit used as a power source of an electrically powered tool, the tool having a power switch, the DC power source unit comprising:

charging means for charging a battery pack used as an alternative power source of the tool;

a power output switch circuit for switching between supplying the DC power to the tool and supplying DC power to the battery pack for charging the battery pack;

a battery condition detecting means for detecting a condition of the battery pack and outputting a condition signal indicative of the condition of the battery pack;

a controller that receives the condition signal from the battery condition detecting means and determines that the battery pack is fully charged when the condition signal has reached a predetermined value, wherein the controller receives the condition signal from the battery condition detecting means and determines that the battery pack is fully charged regardless of whether the charging means is supplied with the DC power.

2. The DC power source unit according to claim 1, wherein battery condition detecting means comprises battery temperature detecting means for detecting a temperature of the battery pack, the condition signal output from the battery temperature detecting means being indicative of the temperature of the battery pack.

3. The DC power source unit according to claim 1, further comprising measuring means for measuring a non-use period of time during which time the tool is continuously held in a non-use condition, wherein the controller outputs a charge enabling signal to the power output switch circuit when the non-use period of time exceeds a predetermined period of time to allow the charging means to resume charging the battery pack.

4. The DC power source unit according to claim 3, further comprising load current detecting means for detecting a load current flowing in the tool, wherein the controller determines that the tool is in the non-use condition when the load current detecting means does not detect the load current.

5. The DC power source unit according to claim 1, further comprising a trigger detector for detecting that the power switch of the tool is turned ON and outputting an ON signal indicative of ON of the power switch to the power output switch circuit, wherein in response to the ON signal, the controller allows the DC power to be supplied to the tool and prohibits the battery pack from being charged.

6. A DC power source unit used as a power source of an electrically powered tool, the tool having a power switch, the DC power source unit comprising:

charging means for charging a battery pack used as an alternative power source of the tool;

a power output switch circuit for switching between supplying the DC power to the tool and supplying DC power to the battery pack for charging the battery pack; and a controller that measures a non-use period of time during which time the tool is continuously held in a non-use condition and outputs a charge enabling signal to the power output switch circuit when the non-use period of time exceeds a predetermined period of time to allow the charging means to resume charging the battery pack.

7. The DC power source unit according to claim 6, further comprising load current detecting means for detecting a load current flowing in the tool, wherein the controller determines that the tool is in the non-use condition when the load current detecting means does not detect the load current.

* * * * *